United States Patent [19]

Ashley, Jr. et al.

[11] 4,009,393
[45] Feb. 22, 1977

[54] DUAL SPECTRAL RANGE TARGET TRACKING SEEKER

[75] Inventors: Glen W. Ashley, Jr., Walnut; Ernest O. Buenting, Upland; Charles A. Leonard, Pomona; Gerhard Lessman, Chino, all of Calif.

[73] Assignee: General Dynamics Corporation, Pomona, Calif.

[22] Filed: Sept. 14, 1967

[21] Appl. No.: 667,822

[52] U.S. Cl. .............................. 250/339; 244/3.16; 250/203 R; 250/236; 250/342; 250/372
[51] Int. Cl.² .................... G01J 1/00; F41G 7/00
[58] Field of Search ............ 250/83.31 R, 83.3 UV, 250/203, 235, 236, 339, 342, 372; 244/3.16

[56] References Cited

UNITED STATES PATENTS

| 3,025,515 | 3/1962 | Fairbanks | 250/203 X |
| 3,093,736 | 6/1963 | McLaughlin et al. | 250/83.3 |
| 3,323,757 | 6/1967 | Cole | 250/203 |

Primary Examiner—Maynard R. Wilbur
Assistant Examiner—S. C. Buczinski

[57] ABSTRACT

In a missile, a target tracking seeker responsive to a dual spectral range of radiation, having two decentered rotating optical elements to provide a rosette or spiral scanning pattern for a dual detector. Associated electronics operate upon the detector signals to guide the missile to its target.

17 Claims, 7 Drawing Figures

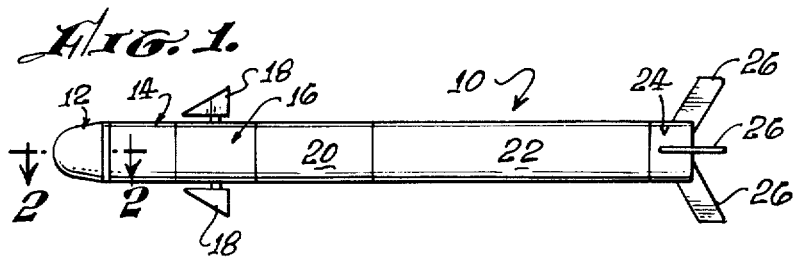
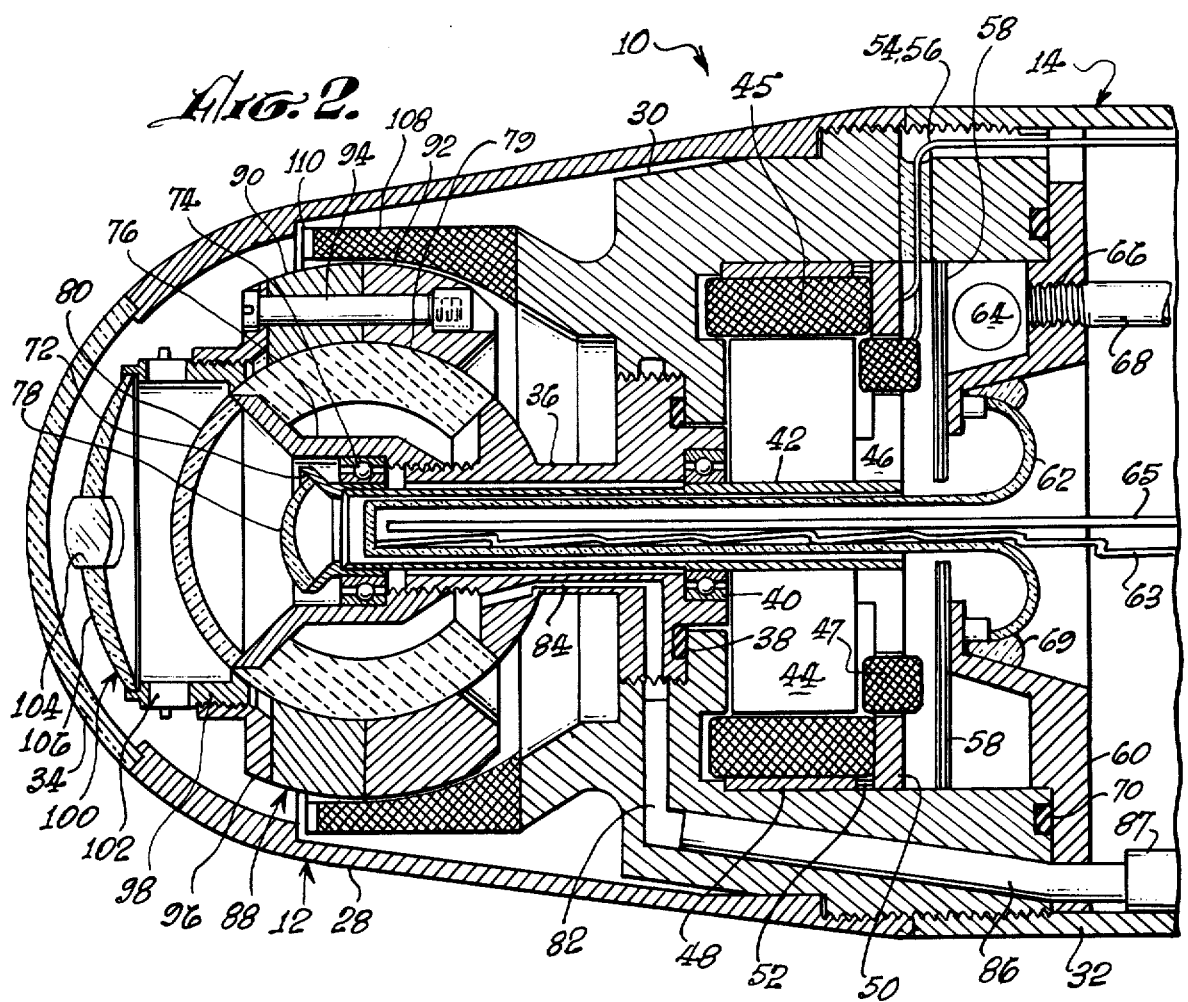

INVENTORS.
GLEN W. ASHLEY, JR.,
ERNEST O. BUENTING,
CHARLES A. LEONARD,
GERHARD LESSMAN,

By Albert J. Miller
ATTORNEY

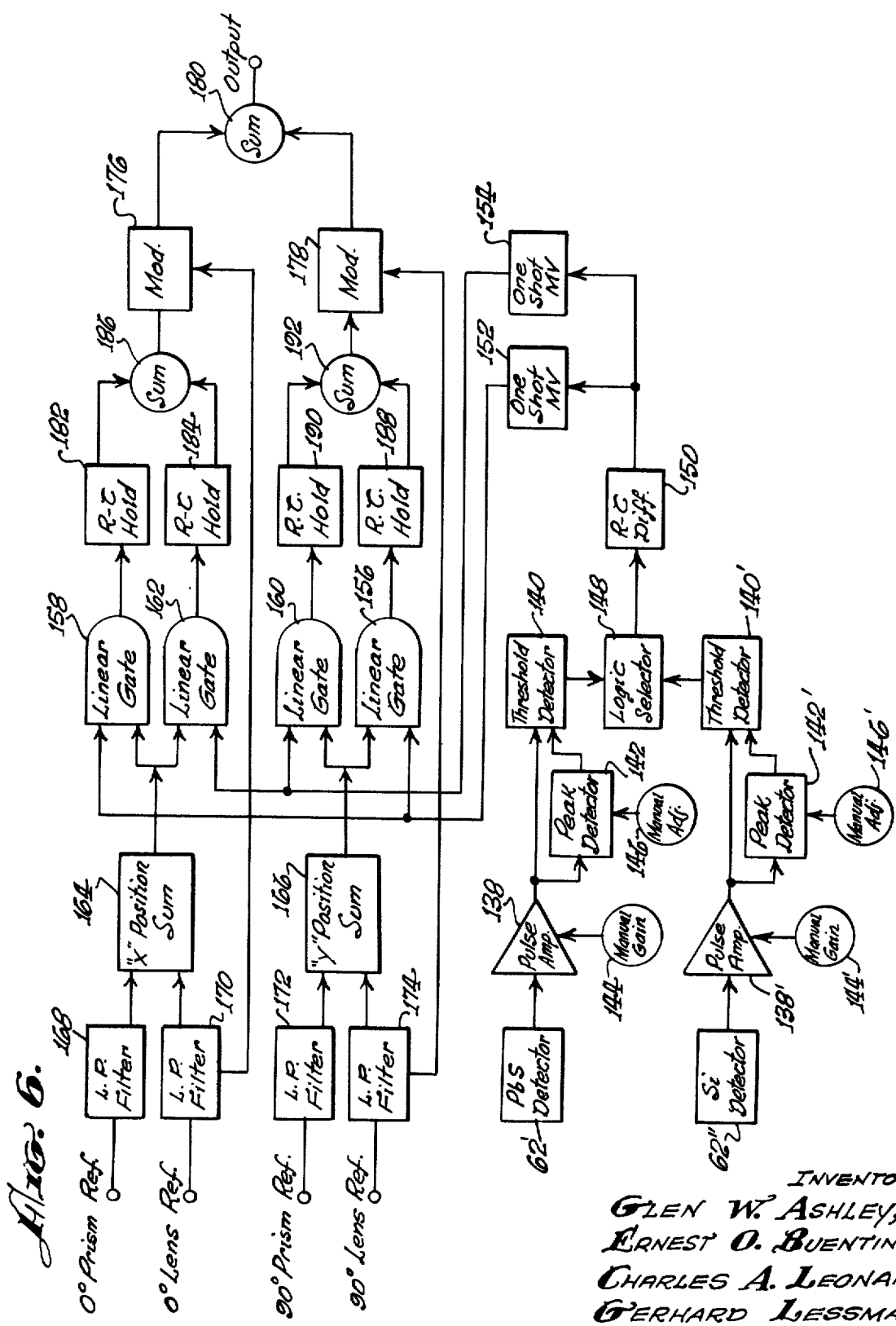

DUAL SPECTRAL RANGE TARGET TRACKING SEEKER

BACKGROUND OF THE INVENTION

This invention relates generally to missile stabilization and trajectory control and more particularly to a target seeker in an automatic missile guidance system.

Present optically guided target seekers do not have sufficient range against cold or head-on targets and are susceptible to a variety of effective countermeasures. A seeker passively responsive to more than one wavelength (mode) of radiation having a more efficient scanning system, readily discriminating between multiple targets and decoys, with improved range and a higher degree of background rejection is urgently needed. In addition, the dual mode seeker should be capable of selecting between modes and switching in flight when appropriate.

SUMMARY OF THE INVENTION

The invention resolves the problems of the prior art by a dual mode seeker having point detection in a rosette or spiral scan. Signal processing electronics continuously select the most advantageous mode of operation from the signals of a dual detector and operate within this mode to home the missile.

Therefore, it is an object of this invention to provide a dual mode target tracking seeker having point detection.

Another object of the invention is to provide a dual mode target tracking seeker having a rosette or spiral scanning of the target. Yet another object of the invention is to provide a dual mode target tracking seeker having associated signal processing electronics to continuously select the most advantageous mode of operation.

Still another object of the invention is to provide a target tracking seeker operable in both the infrared and ultraviolet wavelength regions and having a dual infrared and ultraviolet point detector to receive radiation from a rosette or spiral scanning of the target.

BRIEF DESCRIPTION OF THE DRAWINGS

FIG. 1 is a schematic plan view of an air vehicle utilizing the target tracking seeker described herein.

FIG. 2 is a cross-section of the target tracking seeker taken along line 2—2 of FIG. 1.

FIG. 6 is a schematic block diagram of the signal processing electronics for the target tracking seeker.

DESCRIPTION OF PREFERRED EMBODIMENT

Figure 3:
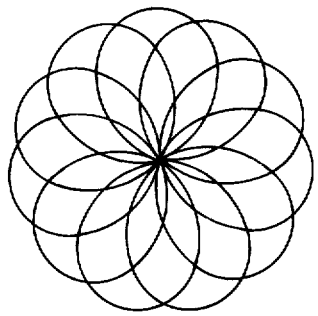
FIG. 3 is a schematic of a rosette pattern generated by the target tracking seeker.

The target tracking seeker of the present invention is an integral part of the control system for an air vehicle such as the missile 10 illustrated in FIG. 1. The seeker is positioned at the extreme forward and of the missile 10 and comprises the seeker head 12 and packaged electronics section 14. The remaining sections of the missile 10 include the control section 16 having a plurality of wings or control surfaces 18, the warhead 20, the propellant motor 22, and the tail section 24 which includes a plurality of tail fins 26.

The missile 10 is launched upon ignition of the propellant motor 22 which imparts sufficient velocity for the guidance control system to become effective. Fins 26 provide a degree of control to the missile. Throughout the flight the seeker head 12 will track the target and through the electronics section 14 will provide signals to the missile control section 16 such as a signal proportional to the rate of change of the angular line-of-sight to the target. These signals are then processed by the missile control section 16 to command movement of the wings or control surfaces 18 to maintain the missile 10 on a collision course with the target. The warhead 20 of the missile 10 is detonated by a fuse upon target intercept, thereby destroying the target.

The missile control section 16, warhead 20, motor section 22 and tail section 24 do not constitute a part of the present invention and therefore details of their construction and function are not deemed necessary except for their operating which is directly related to the seeker head 12 and electronics section 14. If additional information is required in these areas, particularly the control section 16, it can be found in U.S. Ser. Nos. 395,112 and 397,674 both assigned to the same assignee as this application.

The seeker head 12 is illustrated in considerable detail in FIG. 2. Since the head 12 forms the lead section of the basically cylindrical missile 10, the configuration of its exterior surface must be selected with ample consideration to its aerodynamic effect. Hence, either a hemispherical or hemiconical shape is usually demanded. In the seeker head 12 of the present invention, the required configuration is achieved by attaching a suitable hemiconical shaped forward skin 28 to the forward circumferential outer surface of a substantially cylindrical body member 30 to form a cavity to receive the various seeker head components. An aft skin 32 is attached to the aft circumferential outer surface of the body member 30 to provide an enclosure for the packaged electronics section 14.

The body member 30 is of a low permeability high strength material such as a polycarbonate plastic or other structural material whereas the forward skin 28 and aft skin 32 may be fabricated from a phenolic nylon, Lexan, or aluminum. Threaded holes (not shown) in the body member 30 provide a means of attachment for the two skins 28 and 32. The apex of the forward skin 28 contains a centrally located circular opening having a dome 34 bonded therein to permit target radiation in the spectral region of interest to enter the interior of the seeker head 12.

A hollow cylindrical stem 36 of a material such as type 304 corrosion resistant steel is threaded into the body member 30 and extends from the body member into the forward skin cavity. An O-ring seal 38 is utilized between adjoining surfaces of the stem 36 and body member 30. An aft ball bearing 40 mounted within the stem 36 rotatably supports the central portion of a hollow motor shaft 42 extending from a drive motor 44 within the body member 30 cavity. A tachometer 46 is concentrically arranged on the rearward extension of the motor shaft 42. The drive motor coil 45 and tachometer coil 47 are secured within the body member 30 by coil mounting members 48 and 50 separated by a spacer 52. Electrical leads 54 and 56 encapsulated with a silastic compound extend from the coils 45 and 47 respectively through the body member 30 to the electronics section 14 of the missile 10.

A magnetic shield 58 extends across the back of the body member 30 and is held in place by a detector holder 60 which also positions the dual IR-UV detector 62 in the hollow motor shaft 42. The detector 62 and detector holder 60 are joined by a bonding material 69 such as an epoxy. Signal carrying wires 63 extend from the detector to the electronics section of the missile. A cryostat 65 may be mounted within the detector 62 to provide cooling. A desiccant 64 fills the space between the detector holder 60 and the magnetic shield 58. An opening 66 in the holder 60 holds a purge tube 68 to control the atmosphere within this space. A second O-ring seal 70 between adjoining surfaces of the body member 30 and detector holder 60 helps to maintain atmospheric control.

A corrosion resistant steel prism retainer 72 is affixed on the forward end of the motor shaft 42. A forward ball bearing 74 mounted in a corrosion resistant steel cap 76 which extends forward from the stem 36 rotatably supports the retainer 72. A decentered prism 78 is bonded into the retainer 72.

A spherically shaped porous sintered steel or ceramic ball 79 extends between the cap 76 and a raised portion of the stem 36 to serve as a gas bearing surface. A dewar window 80 is bonded into the forward portion of the cap 76 to complete the forward portion of the spherical shape. Passages 82 and 84 in the body member 30 and stem 36 respectively provide access to the interior of the ball 79 from the electronics section 14. A gas tube 86 may extend from the rearward from the passage 82 to a gas generator 87. The body member 30, stem 36, and cap 76 may alternately be fabricated in one piece of the same material.

Arranged to rotate freely about the gas bearing ball 79 is a gyro rotor 88 having a spherically shaped inner surface. The rotor 88 may be made of two ground Alnico 5 halves 90 and 92 held together by threaded pins 94 which also affix a cylindrical lens holder 96 to the forward surface of the rotor 88. A cylindrical lens retainer 98 is mounted on the lens holder 96 to support the lens 100. Both the retainer 98 or holder 96 may be fabricated from a material such as magnesium. A drift nut 102 is provided in the lens retainer 98 to supply focal adjustment for the lens. The combined lens 100 includes both a central UV objective component 104 and a peripherical IR objective component 106.

A gyro coil (stator) 108 having a gyro stop 110 is mounted on the body member 30 and positioned around the gyro rotor 88. Wires (not shown) connect the gyro coil 108 to a power source (not shown) in the electronics section 14.

With respect to the optical components, the dome 34 of either quartz or sapphire, serves essentially as a protective window to admit target radiation into the interior of the seeker. It must be sufficiently strong to resist aerodynamic and shock stresses yet transparent to target radiation in the spectral regions of interest, that is both IR and UV. The dome functions as a concentric meniscus lens having a slight negative power and considerable negative spherical aberration which is helpful for correcting the spherical abberration of the objectives. A 45° half angle can be subtended by the dome, thus ensuring acceptable vignetting. To minimize reflection losses, at least in the IR spectral regions, a film of magnesium fluoride may be applied to both surfaces to maximize transmission at a specified wavelength.

The functions of the combined objective lens 100 are to form an image of the target area upon the dual detector 62, to discriminate between the IR and UV bands, and to provide one rotating component of the rosette scanning motion. The IR and UV objectives 106 and 104 respectively are each provided with an appropriate bandpass filter and both rotate eccentrically with the gyro rotor 88. The aspheric silicon IR objective 106 has a central opening into which the air spaced doublet UV objective is cemented. While the UV objective position is adjusted functionally before cementing, the IR objective can be adjusted within the lens retainer 98.

The optical axis of the IR lens is slightly decentered from the geometrical axis of the outside diameter of the lens. The axial focus of the lens will therefore move around a circle of the decentered radius in the focal plane. The axis of the central hole which accommodates the UV lens is additionally decentered from the optical axis. The front surface of the IR lens may be coated with a low reflectance film to maximize transmission at a specified wavelength while a multiple layer interference filter may be utilized on the rear surface to cut off energy below a certain wavelength.

The UV lens 104 should function in a narrow wavelength band in the near UV for best contrast results, with an aperture equal to 10 percent of the effective aperture of the IR lens 106. An air spaced doublet using color filter glasses may be used. The lens' thicknesses were determined to transmit the maximum of UV with a minimum of long wavelength leakage.

Following the combined lens 100 in the optical path of the target radiation is the dewar window 80 whose exterior surface forms a continuation of the spherical surface of the gas bearing ball or stator 79. A quartz or sapphire window will be transparent to target radiation in the areas of interest yet strong enough to withstand shock due to temperature and pressure differences. The window functions as a concentric meniscus lens which has no effective power or aberations since it operates in a cone of light converging to its center of curvature. A film of magnesium fluoride may be coated on the window to reduce reflections.

The rotating prism 78 has two spherical surfaces of differing radii separated by a thickness equal to the difference between radii on axis, but decentered by an angle sufficient to bend the axial ray from the optical axis in the focal plane of an assumed ideal objective lens system. Either quartz or sapphire may be used for this prism, although sapphire is far superior for certain spectral ranges considered. The non-gimbaling rotating prism may also be coated with reflection reducing films equal to those applied to the dome and dewar window.

The dual detector 62 has separate UV and IR elements since it must operate in widely separated wavelength regions which exceed the spectral range of any presently available single detector. To obtain the full benefits of the rosette or spiral scan, the individual element areas should be limited in area to a 0.003 inch square. The UV element consists of a chip of silicon with a photosensitive diffused junction formed on its front surface. The sensitive area is defined by an evaporated gold electrode. The circuit is completed through a gold electrode deposited on the rear surface.

The photoconductive lead sulfide IR detector is deposited upon an insulating film on the rear surface of the silicon. The IR sensitive lead sulfide is also masked down by an evaporated electrode grid to lessen the sensitive area. Point detection is essentially provided.

Figure 4:
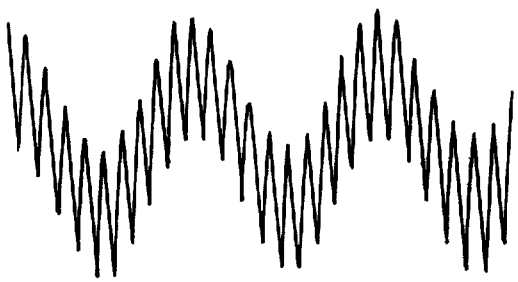
FIG. 4 is a schematic of the waveform resulting from the rosette pattern of FIG. 3.
Figure 5:
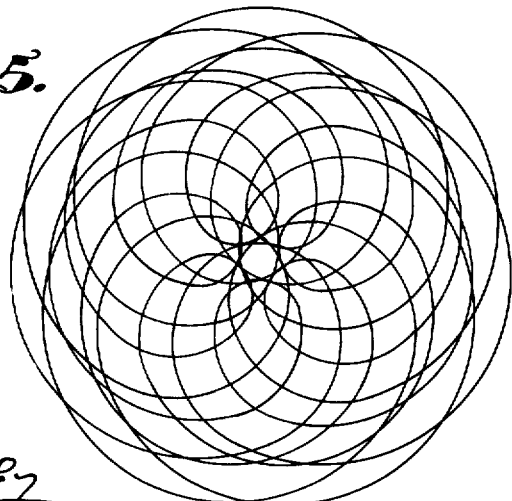
FIG. 5 is a schematic of a spiral pattern generated by the target tracking seeker.

In operation, the prism 78 is rotated at a preselected velocity while the lens 100 is also rotated at a preselected velocity in the opposite direction to produce a rosette scanning pattern and resulting waveform as shown in FIGS. 3 and 4 respectively. The specific forms illustrated would derive from a gyro speed of 200 cycles per second and a prism speed of 10 cycles per second. As the instantaneous field of view is thus scanned over a target, a pulse signal is generated by the dual detector 62. The pulse width would be equal to the time the target image remains upon the detector cell. Alternately, a spiral scanning pattern such as shown in FIG. 5 can be generated by rotating both the prism and lens in the same direction.

The signals from the dual detector 62 are processed in accordance with the electronic circuitry illustrated in FIG. 6. The two elements of dual detector 62, shown in diagrammatic form by way of example in FIG. 6, are a lead sulfide (PbS) detector 62' for IR detection and a silicon (Si) detector 62'' for UV detection. Target information generated by lead sulfide detector 62' is processed by a pulse amplifier 138 connected to detector 62'. The output of the pulse amplifier 138 is coupled to a threshold detector 140 and a peak detector 142, with the output of the peak detector also being coupled to threshold detector 140. The peak detector 142 provides a variable threshold level to increase background rejection and multiple target discrimination. The reference threshold voltage level can be adjusted manually with a manual gain control 144 connected to pulse amplifier 138 and/or a manual adjust control 146 connected to peak detector 142. Similar circuit systems 138' through 146', connected in the same manner to silicon detector 62'', process the target information from silicon detector 62'' in a similar manner as described above for lead sulfide detector 62'. The signal information derived from the IR and UV channels is fed to a logic selector 148 which selects the proper mode for target tracking. The signal pulse information from either the IR channel or the UV channel is differentiated in an R-C differentiating network 150 connected to logic selector 148. The R-C differentiating network 150 produces pulses at both the leading and trailing edges of the target pulses which are coupled to the inputs of respective one-shot or monostable multivibrators 152, 154. One-shot multivibrator 152 is connected to linear gates 156, 158 and one-shot multivibrator 154 is connected to linear gates 160, 162, all gates normally being in the OFF condition. The output pulses of the one-shot multivibrators are used as reference inputs to the linear gates and determine the rate at which the signal information being fed to the gates is being sampled. Also coupled to linear gates 158, 162 is an X position summing network 164. A Y position summing network 166 is connected to linear gates 156, 160. Two low pass filters 168, 170, which receive 0° reference signals from appropriate pickoff coils (not shown) of the prism 78 and the lens 100, respectively, are coupled to the X position summing network 164. Similarly, two more low pass filters 172, 174, which receive 90° reference signals from appropriate pickoff (not shown) of the prism 78 and the lens 100, respectively, are connected to the Y position summing network 166. In addition, low pass filters 170 and 174 are connected to modulators 176, 178, respectively. The modulated signal outputs of modulators 176, 178 are summed in summing network 180. The low pass filters minimize the distortion present in the signals from the pickoff coils. In order to maintain the information rate constant, the differences in the rotational rate of the prism 78 and the lens 100 are held constant by controlling a motor drive oscillator (not shown). Since the difference between prism and lens pickoffs is independent of missile roll in flight, and since the rotational rate of the lens is determined by the gyro speed, the entire rosette pattern is space referenced. The outputs of linear gates 158, 162 are connected to R-C hold networks 182, 184, respectively. The outputs of the R-C hold networks 182, 184 are added in a summing circuit 186 which is coupled to modulator 176. Similarly, the outputs of linear gates 156, 160 are connected to R-C hold networks 188, 190 respectively. The outputs of the R-C hold networks 188, 190 are summed in a summing circuit 192 which is coupled to modulator 178.

In operation, a pulse is generated by PbS detector 62' and by Si detector 62'' every time the instantaneous field of view is scanned over a target. The repetition rate of these pulses may vary, for example, from 10 pulses per second to 200 pulses per second. The target information generated by the detectors is then amplified by the pulse amplifiers 138, 138'. The amplified pulses are then coupled to the threshold detectors 140, 140' which are set to trigger at a level just below the peak signal generated by the target. The peak detectors measure the amplitude of the highest contrasting object within the field of view and the resulting peak levels are used to set the thresholds of the threshold detectors. The information from the threshold detectors is coupled to logic selector 148 which selects the proper mode for target tracking. The logic involved in the logic selector circuit is such that, if the signals from both the IR and UV channels are simultaneously present at its input, the IR signal will be preferred over the UV signal. However, should the IR signal vanish for a time longer than 0.25 second, the UV signal will be accepted. The selected pulses from the logic selector 148 are differentiated in R-C differentiating network 150 to produce pulses at both the leading and trailing edge of the target pulse. Each pulse is processed individually to produce d-c error voltages that represent the position of the two sides of the target. The differentiated leading, trailing pulses cause respective one-shot multivibrators 152, 154 to trigger and generate narrow pulses which may be about 0.1 millisecond, for example. Each of the narrow pulses is used to operate the sets of two linear gates 158, 162 and 156, 160. The gates controlled by the leading edge pulse sample the instantaneous value (pulse width much narrower than the reference signal period) of the X and Y reference signal. Similarly, the gates controlled by the trailing edge pulse sample the same reference signals at a 1 pulse width later, which may be about 0.1 millisecond, for example. The sampled information obtained from the gates is stored in appropriate capacitors in the R-C hold networks 182, 184 and 188, 190. The two sampled values of the X position reference signal are combined in summer 186 to yield a d-c error signal corresponding to the target centroid position. In the same manner, the two sampled values of the Y position reference signal are added in summer 192 to produce the d-c error signal of the target centroid. As a result of the precession principles utilized in the seeker design of the present invention the d-c X and Y error signals must be converted to a-c error signals at the gyro spin frequency. This is accomplished by modulating the d-c X error signal in modulator 176 with the 0° reference coil signal from low pass filter 170. Similarly, the 90° reference coil signal from low pass filter 174 is used to modulate the d-c Y error signal in modulator 178. The two modulated signals are then summed in summer 180 to produce an error signal (1) for the gyro precession coil 108 to gimbal the gyro so that the target image is brought to the center of the field of view and (2) to control the flight path of the missile toward its target. Subsequent scans continuously update this error information.

As described, the target tracking seeker of the present invention includes both IR and UV seeker elements. Accordingly, where a target may not be irradiating sufficient infrared energy to be engaged by the missile operating in its normal IR mode, the target may be tracked by the UV mode. The missile electronics can select the mode offering the best tracking information and are capable of switching from one mode to the other. As a result, cold targets or head-on targets can be successfully tracked. Also, countermeasures against one mode will not normally affect the operation of the other mode. In addition, discrimination against multiple targets and decoys with improved range and with a higher degree of background rejection achieved.

Targets which are clearly visible are detectable by a seeker operating in a visible UV mode regardless of IR target energy. The detected signal may be negative (a nonradiating target seen against a bright background) or positive (a radiating or reflecting target seen against a dark background).

Preferably, the seeker will initially operate in the visual contrast mode until an adequate IR signal is available to home the missile. If a sufficiently IR radiating target is present, the seeker may select and receive in the IR mode.

Figure 7:
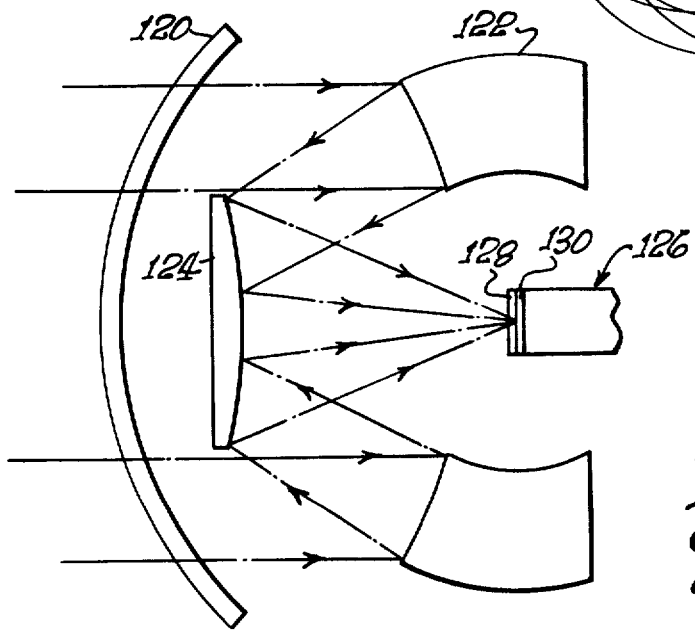
FIG. 7 is a schematic of reflective optics for the target tracking seeker.

While a refractive optical system in FIG. 2 has been described in detail, a folded reflective optical system such as shown in FIG. 7 can be combined with the rotating decentered prism 78 and used with equal success. The substitution of a reflective system in place of the combined lens 100 can in some cases even enhance one or both modes. The reflective/refractive or catadioptric system system would comprise an essentially zero power transparent dome 120 mounted in the forward skin 28, a concave primary reflector 122 mounted on the front face of the gyro rotor 88 and a convex dispersive secondary reflector 124 carried on struts (not shown) extending forward from the gyro rotor 88.

The FIG. 7 embodiment is shown in simplified form to more effectively aid in quickly understanding the pertinent changes that have been made to the FIG. 2 embodiment. It is readily apparent that the dome 34 and the combined lens assembly 100 of FIG. 2 have been positionly replaced by the dome 120 and the convex reflector 124, respectively, in FIG. 7. Except for minor structural details, the addition of the concave reflector 122 and the citing of a specific detector 126, the remainder of the components in the FIG. 2 embodiment are used in the FIG. 7 embodiment. However, the dewar window 80 in FIG. 2 may not be considered necessary in some FIG. 7 configurations. The concave reflector 122 is mounted at an angle relative to the plane which is normal to the axis of rotation of the gyro rotor 88 to, in effect, decenter the concave reflector. It is thus apparent that the rotating decentered concave reflector 122, together with the rotating decentered prism 78 will produce the desired scanning patterns as discussed hereinabove. The techniques wherein tilted or decentered reflectors are utilized in guided missile seeker heads is well understood by those skilled in the art and the general principles involved may be fully understood by referring to U.S. Pat. Nos. 2,948,813; 2,967,247; 2,981,843 and 3,076,095, for example, where other variations of such techniques are shown and described.

The detector 126 would have both UV and IR bandpass filters 128 over the actual detector elements 130.

This results in an inverse telephoto design with the dispersive secondary mirror reducing vignetting. The only other refractive component will be the dome which has essentially zero power. With this system, the rotating prism 78 should be as large as possible to minimize aberrations by reducing the deflection angle. The coplanar dual detector 126 makes a small side by side UV and IR filter deposited inside the detector cover glass possible. The advantage of this optical system would be high resolution, simplicity, and decreased weight outboard of the gyro rotor. The optical efficiency should also be increased.

It should be understood that while specific embodiments of the invention have been illustrated and described, that there are many modifications which can be made thereto without departing from the spirit and scope of the invention, such as a ball bearing gimbal design for the gyro rotor instead of an air bearing. Accordingly, these embodiments are provided solely by way of example and the invention should not be limited thereby but is defined by the proper scope of the appended claims.

What we claim is:

1. A target tracking seeker for an air vehicle comprising:
   a. optical means for receiving a first and a second spectral range of radiations emanating from a target, said optical means including two optically decentered elements;
   b. means for individually rotating the two optically decentered elements of said optical means with respect to each other to produce a substantially point image for said first and said second spectral range radiations, said rotating means operably associated with said optical means;
   c. means for detecting the substantially point image of said first and said second spectral range radiations to produce a first signal indicative of the first spectral range image, and a second signal indicative of said second spectral range image, said detecting means operably associated with said optical means.

2. The target tracking seeker of claim 1 and in addition means associated with said detecting means to select the preferred signal from between said first signal and said second signal.

3. The target tracking seeker of claim 1 wherein said optical means are of the refractive type.

4. The target tracking seeker of claim 1 wherein said optical means are of the catadioptric type.

5. A target tracking seeker for an air vehicle comprising:
   a. a support member;
   b. gyro means mounted upon said support member and having a stator and a rotor;

c. means associated with said gyro means for rotating said rotor;
d. a first decentered optical element mounted upon said gyro rotor to rotate with said rotor and to receive a first and a second spectral range of radiation from a target;
e. a second decentered optical element rotatably mounted on said support member in the optical path of the target radiations from said first decentered optical element;
f. means associated with said second decentered optical element for rotating said optical element, whereby a substantially point image is produced for each of said first and said second spectral range target radiations from said first and said second decentered optical elements;
g. dual detector means mounted within said support member in an optical arrangement with said first and said second rotating decentered optical elements to receive the substantially point images therefrom and produce a first signal indicative of said first spectral range image and a second signal indicative of said second spectral range image.

6. The target tracking seeker of claim 5 and in addition electronic means associated with said dual detector means to continuously select the preferred signal from between said first signal and said second signal to gimbal the gyro rotor and optical element mounted thereupon whereby the target image is brought to the center of the optical field of view.

7. The target tracking seeker of claim 5 wherein said first decentered optical element comprises a first lens element for receiving infrared wavelength radiation and a second lens element for receiving ultraviolet wavelength radiations, said second lens element concentric with said first lens element.

8. The target tracking seeker of claim 7 wherein said second optical element is a decentered prism.

9. The target tracking seeker of claim 8 wherein said dual detector means includes a silicon chip ultra violet detection area and a lead sulfide infrared detection area.

10. The target tracking seeker of claim 5 wherein said first and second decentered optical elements are rotated in the same direction whereby said point images are produced from a spiral scan of the target.

11. The target tracking seeker of claim 5 wherein said first and second decentered optical elements are rotated in opposite directions whereby said point images are produced from a rosette scan of the target.

12. The target tracking seeker of claim 5 wherein the optical path of target radiations from said first optical element, to said second optical element, and to said detector means is refractive.

13. The target tracking seeker of claim 5 wherein the optical path of target radiations from said first optical element, to said second optical element, and to said detector means is "both reflective and refractive".

14. The target tracking seeker of claim 5 and in addition a skin mounted upon the support member to enclose the elements of the target tracking seeker, said skin having a transparent dome to permit entry of target radiations into the interior of the target tracking seeker.

15. The target tracking seeker of claim 6 wherein said electronic means include:
a. threshold detector means operably connected to said dual detector means to receive said first and said second signals therefrom to produce a first and a second output signal triggered at a level just below the peak signal generated by the target;
b. first circuit means operably connected to said threshold detector means to receive said first and said second output signals therefrom to select between the said output signals from said threshold detector means;
c. second circuit means operably connected to said first circuit means to receive the selected signal therefrom and to differentiate the selected signal;
d. monostable multivibrator means operably connected to said second circuit means to receive said differentiated signal therefrom and triggered by said differentiated signal to produce output signals;
e. a source of reference signals;
f. linear gate circuit means operably connected to said source of reference signals and said monostable multivibrator means to receive said reference signals and said output signals from said monostable multivibrator means to produce gate circuit outputs;
g. R-C hold network means operably connected to said linear gate circuit means to momentarily store the gate circuit output signals;
h. summing network means operably connected to said R-C hold network means to receive the signals therefrom to produce d-c error signals of the target centroid.

16. The target tracking seeker of claim 15 wherein said electronic means additionally includes:
a. modulator means operably connected to said summing network and said source of reference signals to receive the d-c error signals from said summing network and convert the d-c error signals to a-c error signals at the rotational spin frequency of said gyro means.
b. a second summing network operably connected to said modulator means to receive said a-c error signals and sum said a-c error signals to produce a drive signal for said gyro means.

17. A target tracking seeker for a rolling missile comprising
a. a substantially cylindrical support member;
b. a gyro stator fixedly mounted upon said support member;
c. a gyro rotor rotatably mounted upon said support member in a spaced relationship with said gyro stator;
d. means mounted upon said support member to rotate said gyro rotor;
e. a first decentered lens element for receiving infrared wavelength radiation mounted upon said gyro rotor and free to rotate therewith.
f. a second decentered lens element for receiving ultraviolet wavelength radiation concentrically mounted within said first lens element.
g. a decentered prism rotatably mounted within said support member in optical alignment with said first and said second lens elements;
h. means mounted within said support member to rotate said decentered prism;
i. dual detector means mounted within said support member in optical alignment with said first and second lens elements and said decentered prism to receive substantially point images from said infrared wavelength radiation and said ultraviolet wavelength radiation to produce a first signal indicative of said infrared wavelength radiation and a second signal indicative of said ultraviolet wavelength radiation.

* * * * *